United States Patent
Blair et al.

(10) Patent No.: US 6,572,045 B2
(45) Date of Patent: Jun. 3, 2003

(54) TAPE CARTRIDGE CONTAINING A REEL PILOTING APPARATUS AND METHOD USING SAME

(75) Inventors: John Ray Blair, Tucson, AZ (US); Dennis Hurley Byrne, Tucson, AZ (US); David Michael Davis, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/799,833

(22) Filed: Mar. 6, 2001

(65) Prior Publication Data

US 2002/0125359 A1 Sep. 12, 2002

(51) Int. Cl.$^7$ .................. G11B 23/04; G11B 23/107
(52) U.S. Cl. .................. 242/337; 242/348; 360/93; 360/132
(58) Field of Search ................ 242/345, 345.2, 242/347, 348, 337; 360/132, 93, 85

(56) References Cited

U.S. PATENT DOCUMENTS

| | | | | |
|---|---|---|---|---|
| 3,620,475 A | * | 11/1971 | Penn | 242/345.2 |
| 3,804,351 A | * | 4/1974 | Kaneko et al. | 242/345 |
| 3,826,440 A | | 7/1974 | Tsukagoshi | 242/55.19 A |
| 4,916,586 A | | 4/1990 | Van Duyn et al. | 362/61 |
| 5,734,540 A | | 3/1998 | Jacobs et al. | 360/132 |
| 5,826,811 A | | 10/1998 | Melbye et al. | 242/345.2 |
| 6,043,963 A | | 3/2000 | Eaton | 360/132 |

* cited by examiner

*Primary Examiner*—John Q. Nguyen
(74) *Attorney, Agent, or Firm*—Dale F. Regelman

(57) ABSTRACT

A tape cartridge which includes an internally disposed rotatable reel, wherein the tape cartridge includes two, three, or a plurality of piloting members disposed adjacent an annular ring to limit the movement of the reel within the tape cartridge. An automated data storage and retrieval system which includes a plurality of Applicants' tape cartridges. A method to prevent damage to a tape medium disposed in a tape cartridge.

3 Claims, 7 Drawing Sheets

TAPE CARTRIDGE CONTAINING A REEL PILOTING APPARATUS AND METHOD USING SAME

FIELD OF THE INVENTION

This invention relates to the field of tape storage cartridges which include a rotatably mounted reel on which is wound a tape media. In particular, the invention relates to a tape storage cartridge having a reel on which the tape media is protected from physical damage.

BACKGROUND OF THE INVENTION

Tape media, such a magnetic tape, is a common medium for the storage of data to be utilized by a computer. Magnetic tape has found widespread use as a data storage medium because it provides a relatively inexpensive solution for storing large amounts of data. There are, however, some problems with the methods previously used to store magnetic tape that can cause damage to the magnetic tape media. This damage results in errors when reading or recording data on the magnetic tape.

Magnetic tape is stored on cartridges of which there are a variety of different types and sizes. One reason for the variety of cartridge types is the variety of different tape drives in which the cartridges are used. Tape cartridges are comprised essentially of a cartridge shell which houses a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges.

The tape cartridge is inserted into a tape drive mechanism which automatically threads the magnetic tape from the tape cartridge through the tape guide mechanism of the tape drive assembly. The tape is then available to the tape drive mechanism for the reading and writing of data.

Data is recorded on magnetic tape in a specific format. The ability of a tape drive mechanism to read data from a piece of magnetic tape is contingent upon the data existing on the tape at positions according to the specific recording format. If a read head is aligned with a segment of magnetic tape in order to read a certain data track but instead a different data track is adjacent the read head, errors in reading the data occur.

One way to ensure that the magnetic tape medium is properly aligned with the read/write heads of the tape drive-mechanism is to use the edge of the magnetic tape medium as a reference position. If, for example, a tape cartridge is loaded with ½" magnetic tape, a tape edge guide mechanism in the tape drive is used whereby one edge of the magnetic tape is kept flush against the tape edge guide. If the width of the tape is constant, ½" in this example, then each track on the magnetic tape is in a known location, according to the recording format of the tape, relative to the read and write heads of the tape drive.

If the edge of a segment of magnetic tape is not straight, the tape edge guide mechanism is not able to properly align the magnetic tape. This can occur when the magnetic tape has been somehow damaged causing a crease, wrinkle, or other deformity, in the edge of the tape. When the damaged portion of the magnetic tape moves along the tape guide, the position of the magnetic tape with respect to the read and write heads is incorrect and, to some extent, unknown.

Errors can then result when reading data from the tape. Typical tape drive devices include a control unit programmed in such a way, through error correction routines, to detect when errors of this type occur. However, even if the error is detectable, there may be no way to read certain data from a damaged tape. These errors are sometimes called permanent errors and can be critical depending on the extent and type of data that is lost.

It is therefore important that tape loaded in a tape cartridge remain undamaged. Tape cartridges are subject to various forms of physical stress and shock. Magnetic tape is often used for long term storage of data for periods of many years therefore the cartridge must protect the tape not just when the cartridge is new but also after many years of physical handling.

Magnetic tape stored in prior art tape cartridges is susceptible to damage when the tape cartridge suffers a physical shock, such as when it is dropped. As described above, magnetic tape is wound on the hub of a reel. The reels have flanges extending from the hub which are flared slightly so that the distance between the flanges is greater at the outer edge of the flanges than the distance between the flanges immediately adjacent the hub. This is because allowance must be made for air to escape from between the layers of tape as the tape is wound on the hub.

It is also necessary to provide an amount of clearance between the reel and the cartridge shell so that the reel can move, to a limited extent, independent of the position of the shell. This clearance is required to allow the reel to be engaged by the motor drive of the tape drive mechanism when the cartridge is inserted into the tape drive mechanism.

Sometimes when the tape is winding on the hub, a layer of tape is wound offset from the rest of the stack of tape wound on the hub. This results in what is termed a "pop strand" or "stagger wrap fin" which is a single layer, or a grouping of layers, which are not edge for edge aligned with the remainder of the tape wound on the hub. The stagger wrap fin extends into the space between the edge of the stack of tape and the adjacent flange. If the cartridge is dropped on the floor and lands on a corner of the cartridge, the shock of the impact can force the outer edge of the reel flange to contact the cartridge shell. This causes the outer edge,of the reel flange to flex inwardly in the direction of the other reel flange, thereby reducing the distance between those reel flanges. In this event, a stagger wrap fin can be pinched between the reel flange and the stack of tape. When a stagger wrap fin gets pinched between the reel flange and the stack of tape, a crease is formed in the tape comprising the stagger wrap fin. Creases in the tape edges destroy the straight, consistent tape edge necessary for error-free operation of the tape drive mechanism.

If the edge of the tape is damaged, then the tape does not thread properly in the tape drive mechanism. When the damaged tape edge passes along the tape edge guide mechanism, the tape is improperly aligned relative to the read and write heads of the tape drive device. This results in errors when reading data from the tape or writing data to the tape. These errors may be, as described above, permanent errors which cannot be corrected through error correction codes. Permanent errors can be catastrophic depending on the criticality of the data that is lost.

Tape cartridges containing, for example, magnetic tape, are often used in automated data storage libraries. Such automated media storage libraries are known for providing cost effective access to large quantities of stored media. One (or more) accessor typically accesses the tape cartridges from a plurality of storage slots and delivers the accessed tape cartridge to a data storage drive for reading and/or writing data on the accessed tape cartridge. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

There exists a need for tape a cartridge that better protects the magnetic tape wound on the cartridge. In particular, there exists a need for a tape cartridge that is less susceptible to damaging the edge of a magnetic tape wound on the cartridge. Such an improved tape cartridge comprises a useful improvement to an automated data storage system.

SUMMARY OF THE INVENTION

Applicants' invention includes a tape cartridge having a shell formed from a top side and a bottom side. This shell comprises a top surface and an inner surface. Applicants' apparatus further includes a reel rotatably disposed within said shell. This reel includes a hub having a first side and an opposing second side. The reel is rotatable disposed with the shell such that its first side is disposed adjacent the inner surface of the top side of the shell.

The hub portion of Applicants' apparatus includes an aperture internally disposed therein and extending through the first side of the hub. In one embodiment, this aperture is circular is shape and the walls of the aperture comprise a cylindrical surface.

An annular ring having a first side, an opposing second side, a first surface and an opposing second surface, is disposed on the aperture's cylindrical surface such that the second side extends inwardly from the cylindrical surface toward the center of the aperture. The first surface of the annular ring has a facing relationship with the inner surface of the top side of the shell.

Applicants' apparatus further includes a first piloting member having a proximal end and a distal end. The proximal end of this first piloting member is disposed on the inner surface of the top side of the shell, and the distal end of this first piloting member extends outwardly from the inner surface such that this distal end of said first member is positioned adjacent the first surface of the annular ring. Applicants' invention includes a second piloting member having a proximal end and a distal end. The proximal end of this second piloting member is disposed on the inner surface of the top side of the shell, and the distal end of this second piloting member extends outwardly from the inner surface such that this distal end of the second piloting member is positioned adjacent the first surface of the annular ring. In other embodiments, three or more piloting members are disposed on the inner surface of the top side of the shell such that their corresponding distal ends are positioned adjacent the top surface of the annular ring disposed in the aperture.

The gaps between the two, three, or more, piloting members and the top surface of the annular ring are adjusted in order to limit the rotation of the reel within the shell. In addition, the gaps between the two, three, or more, piloting members and the cylindrical wall of the aperture are adjusted to limit the lateral movement of the reel within the shell.

In other embodiments, Applicants' apparatus includes an annular member disposed on the inner surface of the bottom side of the shell. This annular member extends into an annular groove disposed on the bottom side of the reel. The gap between the top of the annular member and the floor of the annular groove is adjusted to limit the rotation and lateral movement of the reel within the shell.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
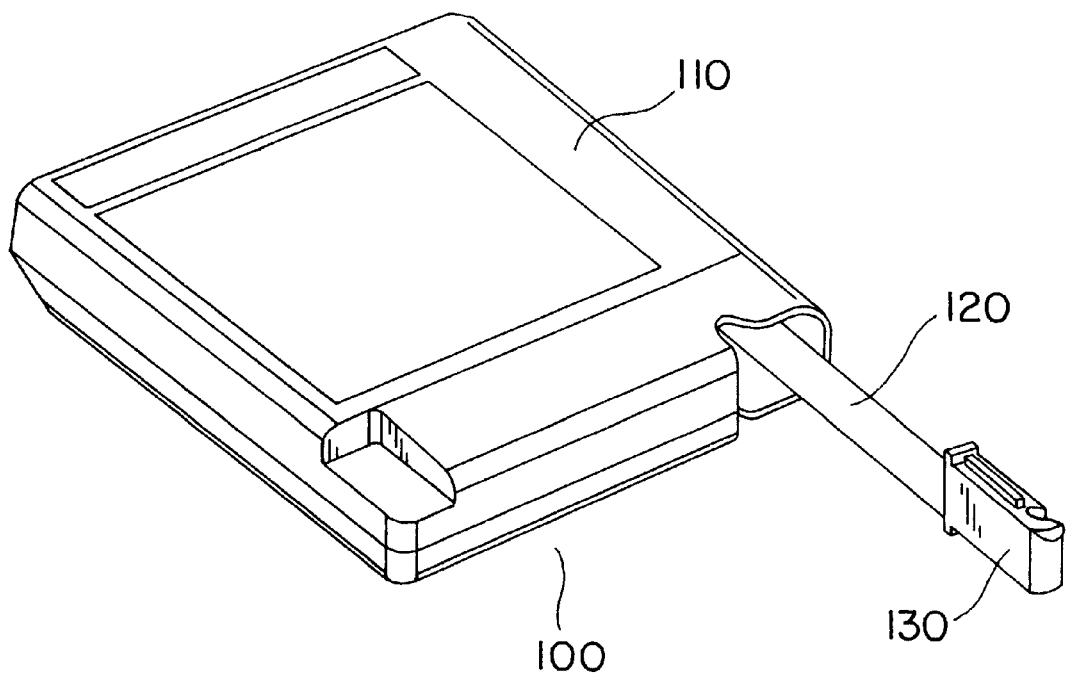
FIG. 1 shows a complete tape cartridge.

FIG. 1 depicts tape cartridge 100 of the type that is the subject of the present invention. Tape cartridge 100 comprises cartridge shell 110 which encases a reel (not shown in FIG. 1) around which is wound magnetic tape 120. Leader block 130 is attached to the end of the length of magnetic tape 120 contained inside shell 110 and is formed to cooperate with the tape drive mechanism (not shown) to allow the automatic threading of magnetic tape 120 in the tape drive mechanism. Leader block 130 and attached magnetic tape 120 are shown slightly extended from shell 110 in FIG. 1. There are various features not shown on shell 110, such as locating notches, write-inhibiting switches, and the like, which are not relevant to the present invention. It is apparent to those skilled in the art that tape cartridge 100 is only exemplary and the present invention is applicable to any configuration of tape cartridge 100.

Figure 2:
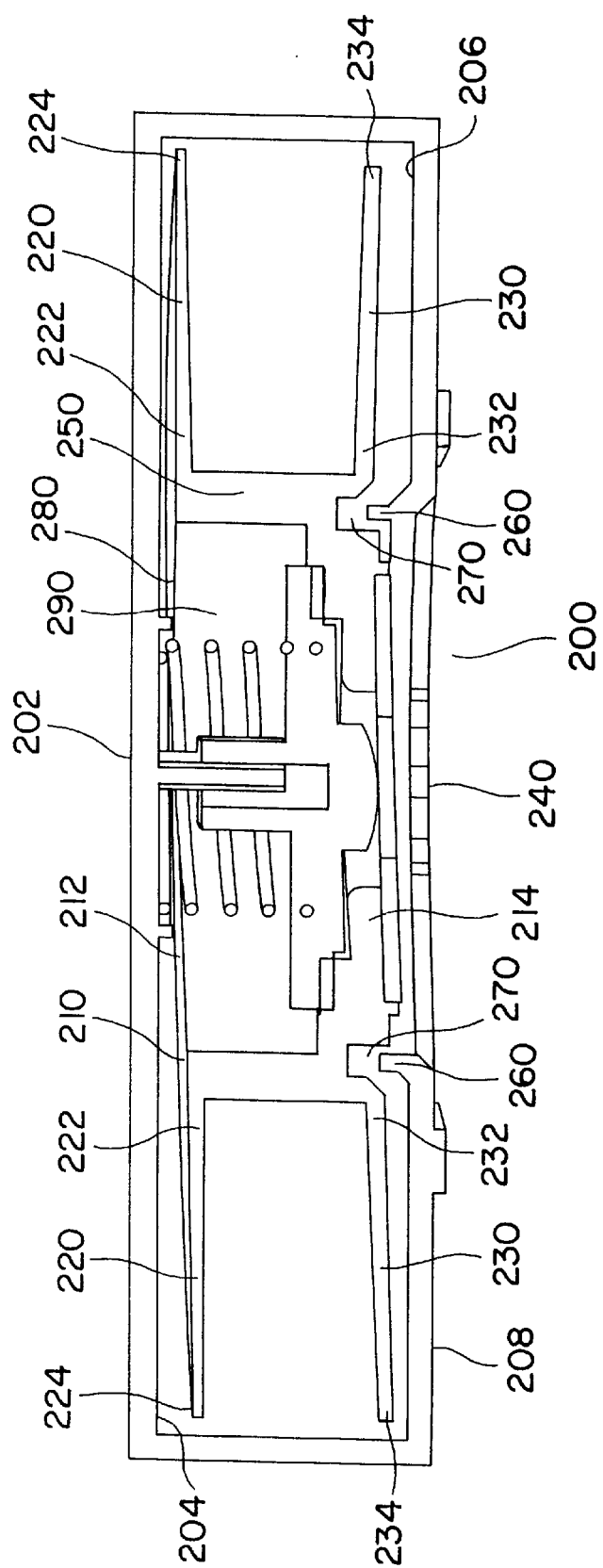
FIG. 2 shows a schematic view of a reel within a prior art tape cartridge.

FIG. 2 shows a schematic representation of a cut-away view of prior art tape cartridge 200. Reel 210 is contained within shell 202 and, when engaged by a drive motor mechanism (not shown) of the tape drive mechanism as described below, spins within shell 202 in response to the operation of the drive motor. Reel 210 comprises top portion 212 and bottom portion 214.

Reel 210 includes annular-shaped hub 250 and flanges 220 and 230. Flanges 220 and 230 connect to, and extend radially outward from, hub 250 forming a channel between them in which tape (not shown in FIG. 2) is contained as that tape is wound around hub 250. Flange 220 is disposed on top portion 212 of reel 210. Flange 220 includes proximal end 222 disposed at the connection point between flange 220 and hub 250, and distal end 224 disposed outwardly from hub 250. Flange 230 is disposed on bottom portion 214 of reel 210. Flange 230 includes proximal end 232 disposed at the connection point between flange 230 and hub 250, and distal end 234 disposed outwardly from hub 250.

In operation, a drive motor mechanism extends through drive motor port 240 in shell 202 and engages reel 210 through hub 250. In response to signals from a tape drive controller, the drive motor mechanism rotates reel 250. The operation of the drive motor mechanism is coordinated with the remainder of the tape drive mechanism to draw tape 120 (FIG. 1) from tape cartridge 200 for use in the tape drive mechanism to, for example, read and/or write data thereon. There must be a certain amount of clearance between reel 250 and shell 202. This is necessary to allow reel 250 to move slightly with respect to shell 202 to allow proper engagement between reel 250 and the drive motor mechanism.

Annular member 260 is disposed on interior surface 206 of bottom portion 208 of shell 202. Reel 210 includes annular groove 270 disposed on bottom portion 214. As shown in FIG. 2 annular member 260 extends into annular groove 270 thereby providing a dust seal. In this prior art cartridge, the gap between annular member 260 and annular groove 270 is not adjusted to prevent movement of reel 210 within shell 202 such that distal ends 224 and/or 234 of flanges 220 and 230, respectively, can strike the inside surface of shell 202.

Aperture 280 extends through top portion 212 of reel 210. Aperture 280 is symmetrically disposed around the center of reel 210. Wall 290 of aperture 280 is cylindrical in shape.

Figure 3:
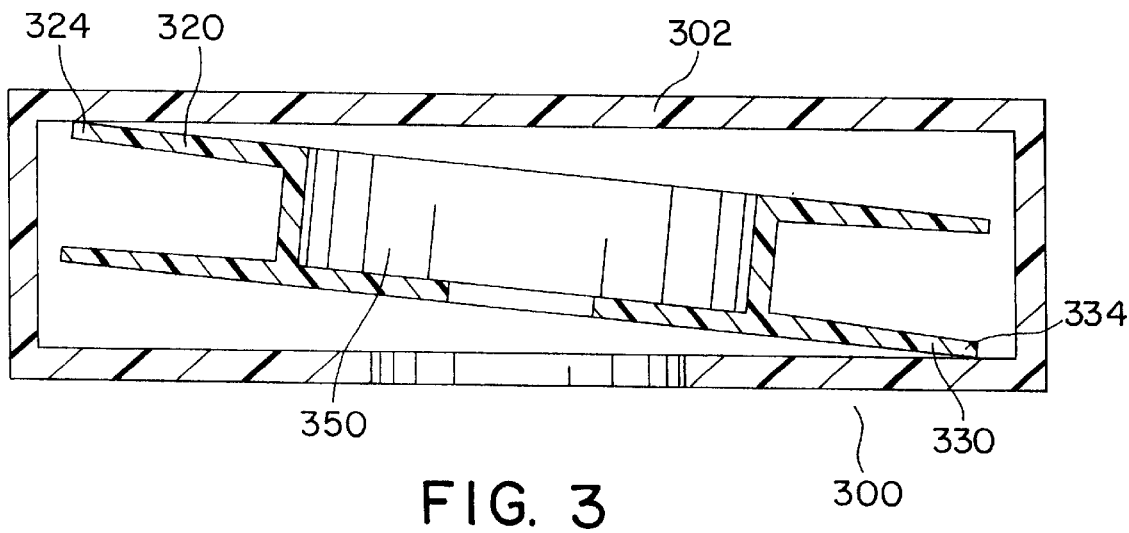
FIG. 3 shows a schematic view of a reel within a prior art tape cartridge.

In FIG. 3, reel 350 is depicted at an angle within shell 302. This illustrates the degree of movement of reel 350 within shell 302 possible in many prior art tape cartridges. As shown in FIG. 3, distal end 324 of flange 320 contacts the top side inner surface of shell 302, while distal end 334 of flange 330 contacts the bottom side inner surface of shell 302. Such contact between flanges 320 and 330 and shell 302 is disadvantageous for the reasons discussed above.

Figure 4:
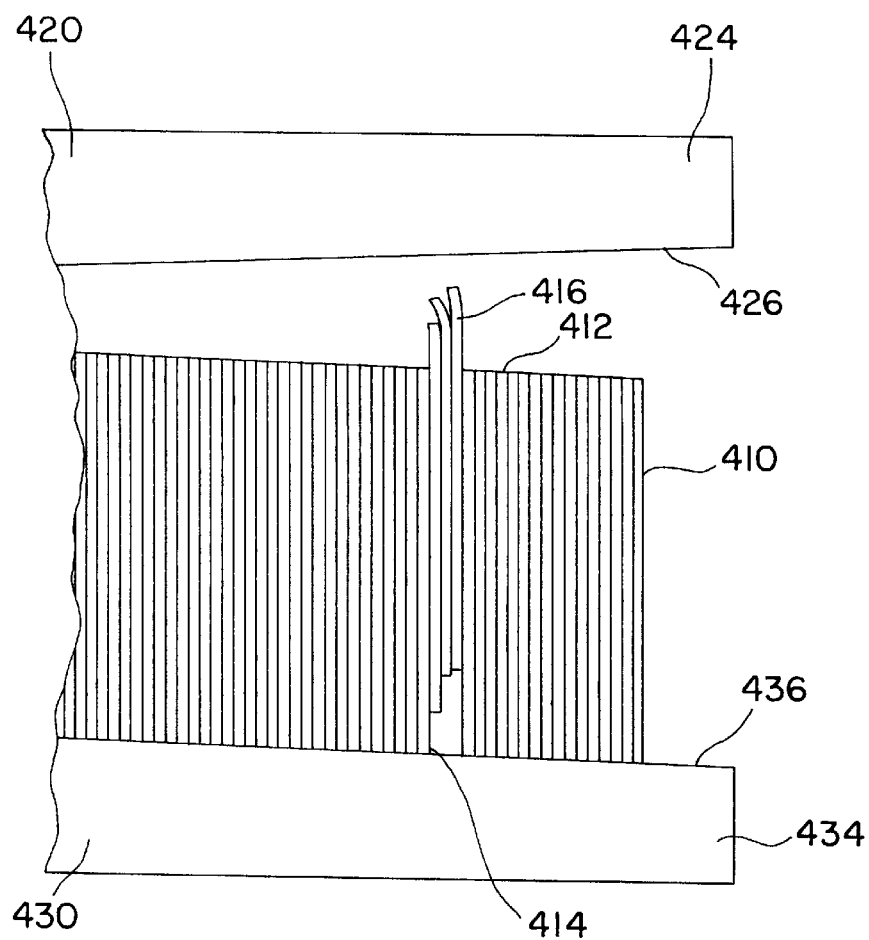
FIG. 4 shows a cutaway schematic view of magnetic tape held within the reel flanges of a tape cartridge.

Such disadvantageous contact between flanges 320 and 330 and the cartridge shell 302 can occur when the tape cartridge is in operation within a drive device, and when the tape cartridge is external to such a tape drive device. For example, if tape cartridge 300 is dropped, the resulting contact with the floor subjects the cartridge, and its contents, to a mechanical force. That impact force can cause reel 350 to cant as shown in FIG. 3, such that the distal ends 324 and 334 of flanges 320 and 330, respectively, contact cartridge shell 302. In this canted configuration, the mechanical force is transferred to the distal ends 324 and 334. This force causes the distal ends 324 and 334 to flex inwardly thereby decreasing the distance between the distal ends of flanges 320 and 330. As shown in FIG. 4, such inward flexing of the distal ends of flanges 320 and 330 can cause damage to the tape would around reel 350.

FIG. 4 is a more detailed section view of distal ends 424 and 434 of flanges 420 and 430, respectively, showing a section through the windings of tape 410. Tape 410 comprises a first edge 412 and an opposed second edge 414. The distance between flanges 420 and 430 is smallest at their proximal ends disposed adjacent hub 210 (FIG. 2). Inner surface 426 of flange 420 and inner surface 436 of flange 430 are angled such that the distance between flange 420 and flange 430 increases with radial distance from hub 210. This is necessary to allow air to escape from between the layers of tape 410 as tape 410 is wound around hub 210 at a high rate of revolutions per second.

When tape 410 is wound on reel 210 (FIG. 2), tape 410 typically stacks flush along one of flanges. As shown in FIG. 4, tape 410 is, for the most part, wound such that edge 414 remains flush with inner surface 436 of flange 430, leaving a space between edge 412 and inner surface 426 of distal end 424. At distal ends 424 and 434, the clearance between tape 410 and flange 420 is maximized.

Typically tape 410 winds around hub 210 such that the edges 412 and 414 in each winding are aligned with the edges of tape 410 in the other windings. Occasionally, however, a winding of tape 410, or a group of windings of tape 410, extend beyond the rest of the stack of tape 410 wound on hub 210 (FIG. 2). This occurrence is represented in FIG. 4 by stagger wrap fin 416. Stagger wrap fin 416 is comprised of several windings of tape 410 which are not aligned with the rest of the windings of tape 410.

In the event a mechanical force causes inward flexing of distal ends 434 and 434, inner surface 426 could strike stagger wrap fin 416. Such contact between inner surface 426 and stagger wrap fin 416 can form a crease in tape 410. Such a crease can cause problems reading data from, or writing data to, tape 410.

Figure 5:
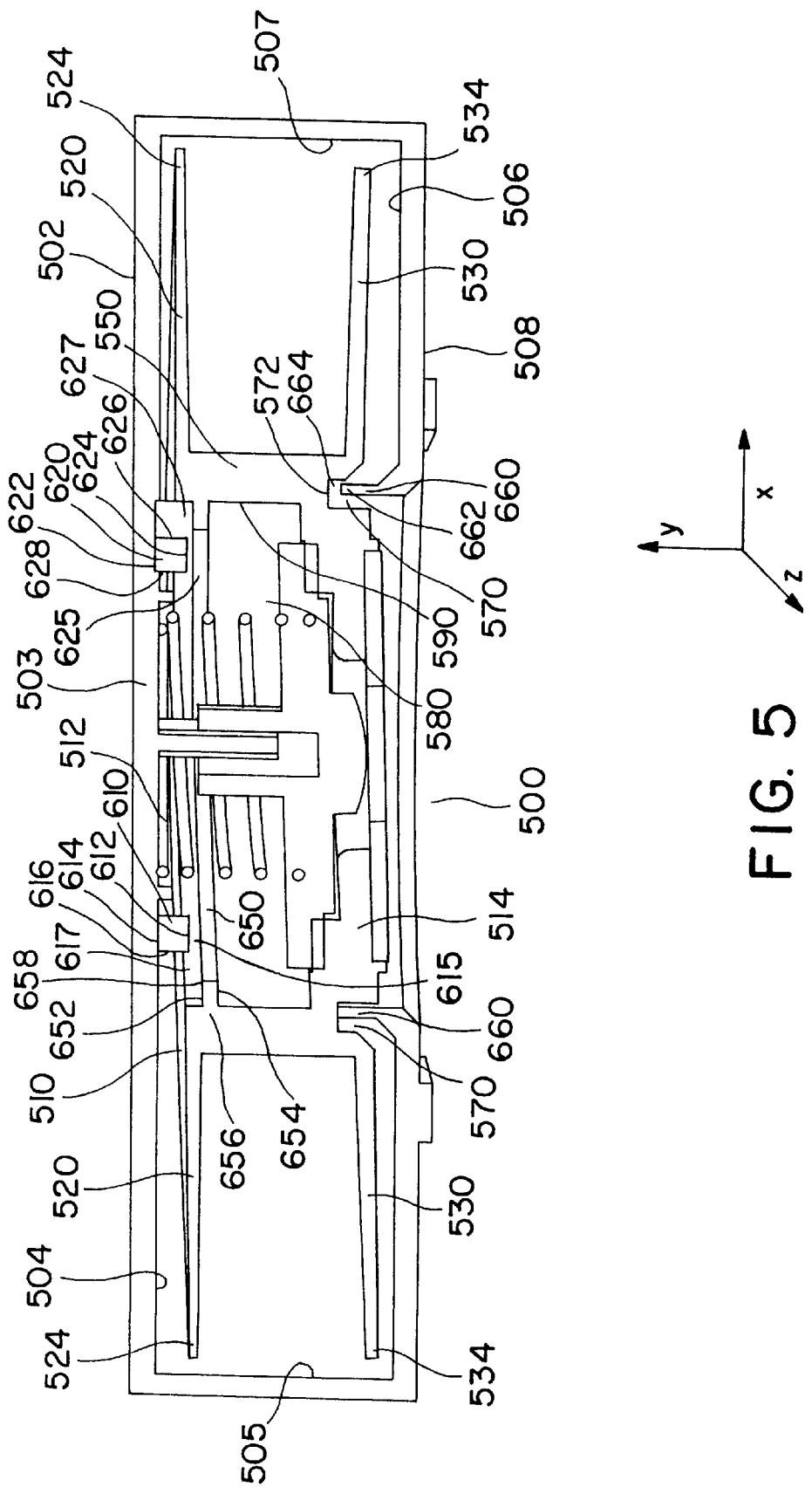
FIG. 5 shows a schematic view of one embodiment of Applicants' tape cartridge.

FIG. 5 shows a schematic representation of a cut-away view of Applicants' tape cartridge 500. Reel 510 is contained within shell 502. Reel 510 comprises top portion 512 and bottom portion 514.

Reel 510 includes annular-shaped hub 550 and flanges 520 and 530. Flanges 520 and 530 connect to, and extend radially outward from, hub 550 forming a channel between them in which tape (not shown in FIG. 2) is contained as that tape is wound around hub 550. Flange 520 is disposed on top portion 512 of reel 510. Flange 520 includes proximal end 522 disposed at the connection point between flange 520 and hub 550, and distal end 524 disposed outwardly from hub 250. Flange 530 is disposed on bottom portion 514 of reel 510. Flange 530 includes proximal end 532 disposed at the connection point between flange 530 and hub 550, and distal end 534 disposed outwardly from hub 550.

Annular member 660 is disposed on interior surface 506 of bottom portion 508 of shell 202. Distal end 662 of annular member 660 extends outwardly from surface 506. Reel 510 includes annular groove 570 disposed on bottom portion 514. Annular groove 570 comprises two opposed walls and floor 572 connecting said walls. As shown in FIG. 5 annular member 660 is longer than prior art annular member 260 shown in FIG. 2. In Applicants' tape cartridge apparatus, gap 664 between annular member 660 and annular groove 270 is adjusted to limit the movement of reel 510 within shell 502 such that distal ends 524 and/or 534 of flanges 520 and 530, respectively, cannot strike the inside surface of shell 502.

Aperture 580 extends through top portion 512 of reel 510. Aperture 580 is symmetrically disposed around the center of reel 510. Wall 590 of aperture 580 is cylindrical in shape. Annular ring 650 includes first side 656 and second side 658. First side 656 is disposed on wall 590 within aperture 580, and second side 658 extends inwardly from wall 590 toward the center of aperture 580. Annular ring 650 further includes top surface 652 and bottom surface 654.

First piloting member 610 includes proximal end 612, distal end 614, first side 616, and second side 618. Proximal end 612 is disposed on inner surface 504 of shell 502. Distal end 614 is positioned adjacent top surface 652 of annular ring 650. Gap 615 separates distal end 614 from top surface 652. Gap 617 separates first side 616 from cylindrical surface 590. First piloting member 610 comprises a cube, a parallelepiped, a sphere, or a cylinder.

Second piloting member 620 includes proximal end 622, distal end 624, first side 626, and second side 628. Proximal end 622 is disposed on inner surface 504 of shell 502. Distal end 624 is positioned adjacent top surface 652 of annular ring 650. Gap 625 separates distal end 624 from top surface 652. Gap 627 separates first side 626 from cylindrical surface 590. Second piloting member 620 comprises a cube, a parallelepiped, a sphere, or a cylinder.

The embodiment shown in FIG. 5 includes two piloting members disposed on interior surface 504 of top side 502 such that those two piloting members are symmetrically arranged around the center of aperture 580. In other embodiments, three piloting members are disposed on interior surface 504 of top side 502 such that those three piloting members are symmetrically arranged around the center of aperture 580.

In yet other embodiments, a plurality of piloting members are disposed on interior surface 504 of top side 502 such that this plurality of piloting members are symmetrically arranged around the center of aperture 580. In the two piloting members embodiments, the three piloting member embodiments, and the plurality of piloting member embodiments, the individual piloting members comprise cubes, parallelepipeds, spheres, cylinders, and combinations thereof.

Figure 6:
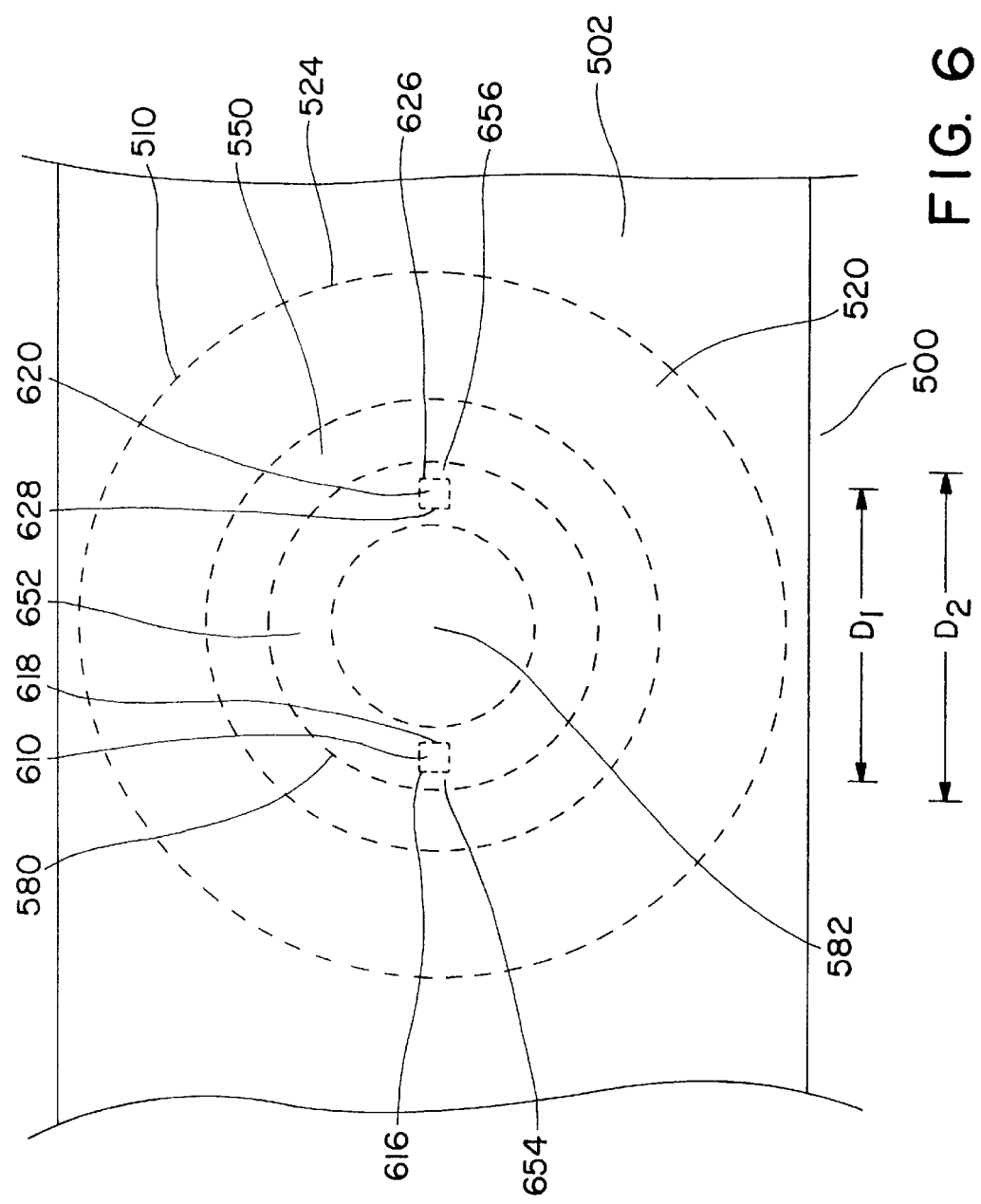
FIG. 6 shows a top view of one embodiment of Applicants' tape cartridge.

FIG. 6 is a top view of Applicants' two piloting member embodiment. FIG. 6 depicts the relationship of certain internal structures to one another. FIG. 6 shows embodiments wherein the piloting members comprise a cube(s) and/or a parallelepiped(s). The two piloting members of this embodiment may have the same shape or may have differing shapes.

Distal end 614 (FIG. 5) of first piloting member 610 is disposed adjacent first portion 654 of top surface 652 of annular ring 650. First side 616 of first piloting member 610 faces outwardly away from center 582 of aperture 580 while second side 618 faces inwardly toward center 582 of aperture 580.

Distal end 624 (FIG. 5) of second piloting member 620 is disposed adjacent second portion 656 of top surface 652 of annular ring 650. First side 626 of first piloting member 620 faces outwardly away from center 582 of aperture 580 while second side 628 faces inwardly toward center 582 of aperture 580.

First portion 654 of top surface 652 of annular ring 650 and second portion 656 of top surface 652 of annular ring 650 are symmetrically disposed around center 582 of aperture 580. The distance D1 between first side 616 of first piloting member 610 and first side 626 of second piloting member 620 is less than distance D2 which is the diameter of aperture 580.

Figure 7:
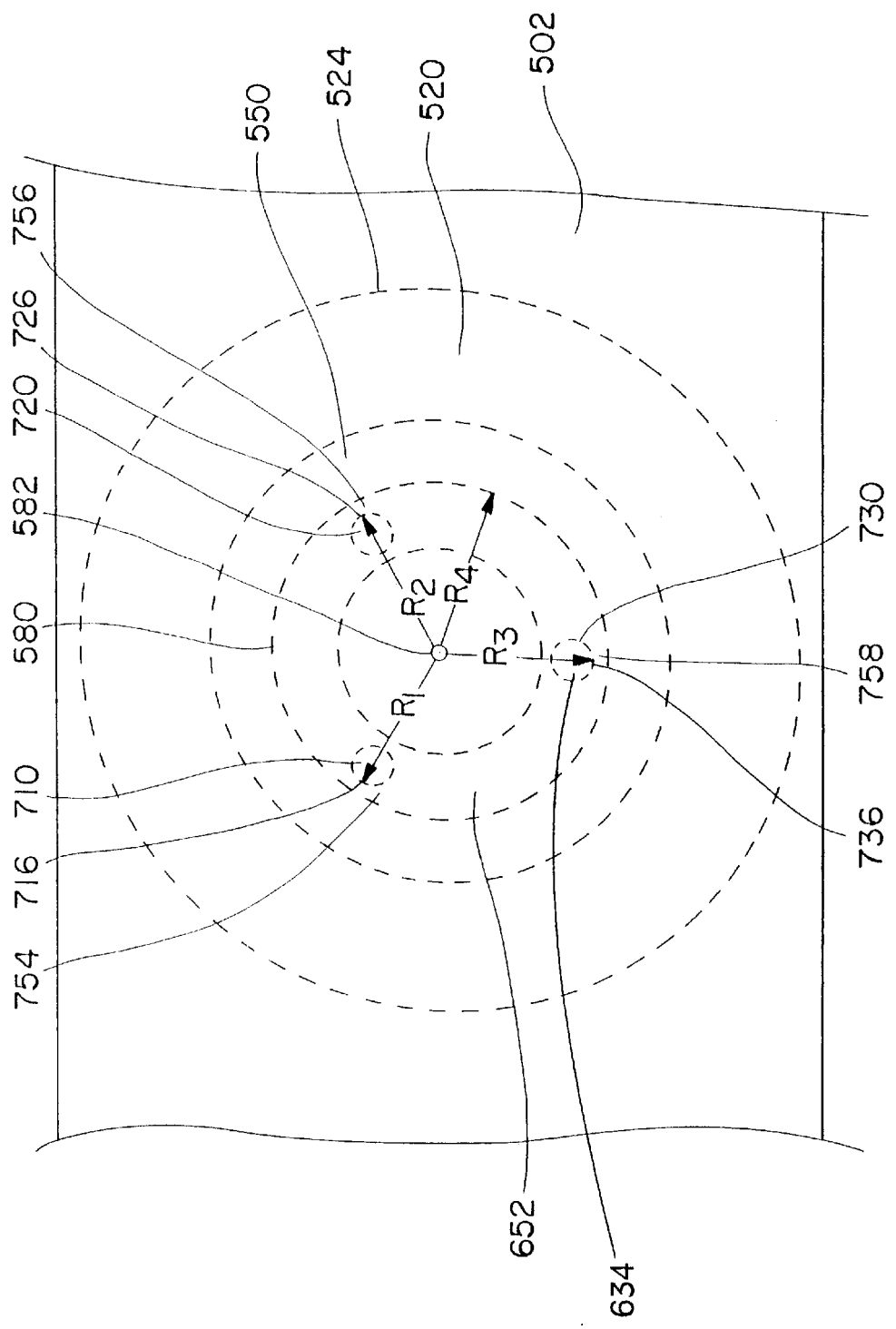
FIG. 7 shows a top view of a second embodiment of Applicants' tape cartridge.

FIG. 7 is a top view of Applicants' three piloting member embodiment. FIG. 7 shows embodiments wherein the three piloting members comprise spheres and/or cylinders shape. The three piloting members of this embodiment may have the same or differing shapes.

Distal end 614 (FIG. 5) of first piloting member 710 is disposed adjacent first portion 754 of top surface 652 of annular ring 650. Distal end 624 (FIG. 5) of second piloting member 720 is disposed adjacent second portion 756 of top surface 652 of annular ring 650. Distal end 634 (FIG. 7) of third piloting member 730 is disposed adjacent third portion 758 of top surface 652 of annular ring 650.

First portion 754 of top surface 652 of annular ring 650, second portion 756 of top surface 652 of annular ring 650, and third portion 758 of top surface 652 of annular ring 650, are symmetrically disposed around the center 582 of aperture 580. Radius R1 comprises the distance between center 582 and first side 716 of first piloting member 710, first side 716 comprising that portion of first piloting member 710 disposed farthest from center 582. Radius R1 is less than the radius R4 of aperture 580. Radius R2 comprises the distance between center 582 and first side 726 of second piloting memfrer 720, first side 726 comprising that portion of second piloting member 710 disposed farthest from center 582. Radius R2 is less than the radius R4 of aperture 580. Radius R3 comprises the distance between center 582 and first side 736 of third piloting member 730, first side 736 comprising that portion of third piloting member 730 disposed farthest from center 582. Radius R3 is less than the radius R4 of aperture 580.

Figure 8:
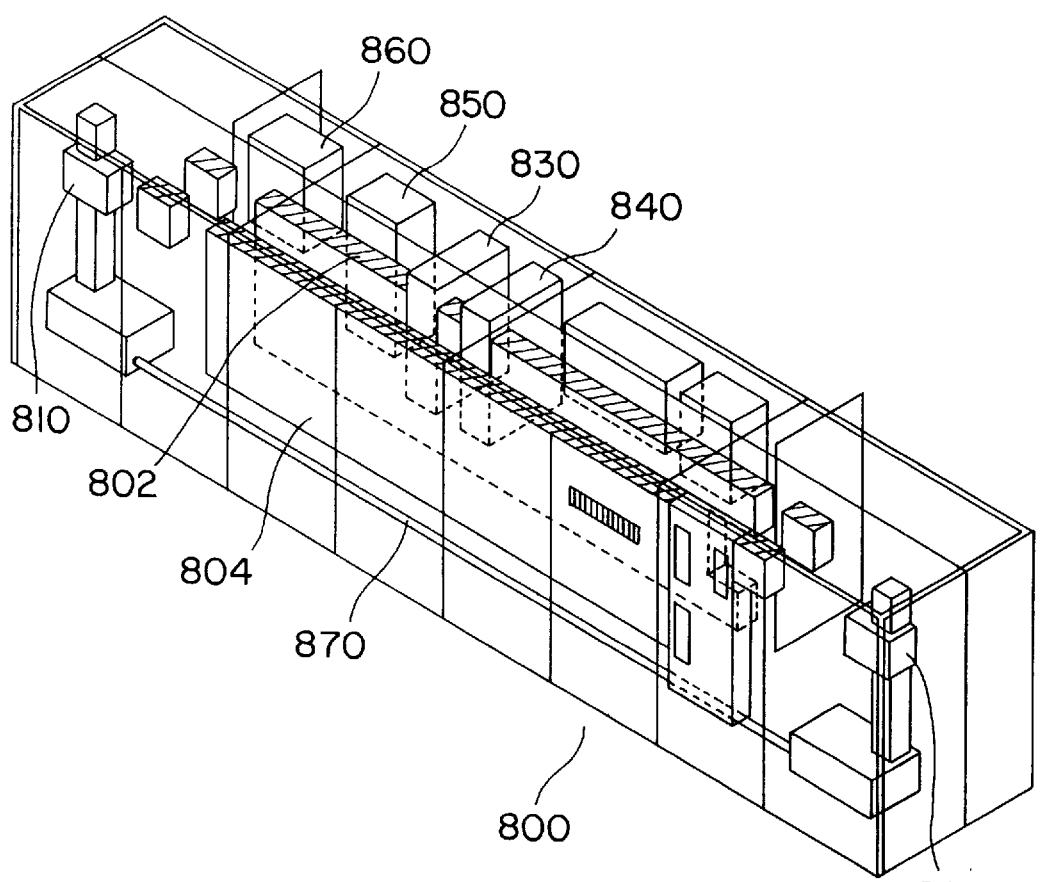
FIG. 8 shows a perspective view of Applicants' automated data storage library.

Applicants' tape cartridge is used as one component in Applicants' automated data storage system. Referring to FIG. 8, automated data storage system 800 is shown having a first wall of storage slots 802 and a second wall of storage slots 804. Applicants' tape cartridges are individually stored in these storage slots.

Applicants' invention comprises an automated data storage system using Applicants' tape cartridge, which includes one or more accessors, such as accessors 810 and 820. An accessor is a robotic device which accesses Applicants' tape cartridges from storage slots 802 or 804, delivers that accessed tape cartridge to data storage drives 830/840 for reading and/or writing data thereon, and returns the media to the proper storage slot. As shown in FIG. 8, accessors 810 and 820 travel bi-directionally along rail 870 in an aisle disposed between first wall of storage slots 802 and second wall of storage slots 804. Accessor control 860 controls accessors 810 and 820. Operator input station 850 permits an operator to communicate with automated data storage system 800.

Referring again to FIG. 5, Applicants' method to minimize or prevent damage to tape 120 (FIG. 1) disposed on reel 510 involves limiting the movement of reel 510 within shell 502 along axes other than the desired axis of rotation, i.e. along the axis disposed between the top side 503 and bottom side 508 of shell 502. As those skilled in the art will appreciate, reel 510 is designed to rotate around the Y axis shown in FIG. 5.

In the event a mechanical force impacts shell 502, the movement or rotation of reel 510 within shell 502 along an axis other than the Y axis (FIG. 5) is limited by first piloting member 610 and second piloting member 620.

For example, if a mechanical force causes reel 210 to rotate around the Z axis in a first direction, such as a clockwise direction with reference to FIG. 5, first piloting member 610 contacts annular ring 650 thereby preventing further rotation of reel 210. Similarly, in the event a mechanical force causes reel 210 to rotate around the Z axis in a second direction, such as a counterclockwise direction, second piloting member 620 contacts annular ring 650 thereby preventing further rotation of reel 210.

In addition, in the event of lateral movement of reel 510 along the −X axis shown in FIG. 5, first piloting member 610 contacts cylindrical wall 590 thereby preventing further movement of reel 510. Similarly, in the event of lateral movement of reel 510 along the +X axis shown in FIG. 5, second piloting member 620 contacts cylindrical wall 590 thereby preventing further movement of reel 510.

Gap 615 is adjusted such that, upon rotation of reel 210 in a first direction around the Z axis shown in FIG. 5, first piloting member 610 contacts first surface 652 before distal end 524 of flange 520 contacts inner surface 504 of shell 502, and before distal end 534 of flange 530 contacts inner surface 506 of shell 502. In addition, gap 664 is adjusted such that, upon such a rotation of reel 210, distal end 662 of annular member 660 contacts floor 572 of annular groove 570 before distal end 524 of flange 520 contacts inner surface 504 of shell 502, and before distal end 534 of flange 530 contacts inner surface 506 of shell 502.

Similarly, gap 625 is adjusted such that, upon rotation of reel 210 in a second direction around the Z axis shown in FIG. 5, second piloting member 620 contacts first surface 652 before distal end 524 of flange 520 contacts inner surface 504 of shell 502, and before distal end 534 of flange 530 contacts inner surface 506 of shell 502. In addition, gap 664 is adjusted such that, upon such a rotation of reel 210, distal end 662 of annular member 660 contacts floor 572 of annular groove 570 before distal end 524 of flange 520 contacts inner surface 504 of shell 502, and before distal end 534 of flange 530 contacts inner surface 506 of shell 502.

Gap 617 is adjusted such that movement of reel 510 in the −X direction shown in FIG. 5 causes first side 616 of first piloting member 610 to contact cylindrical wall 590 before distal ends 524 and/or 534 contact inner surface 505 of shell 502. Gap 627 is adjusted such that movement of reel 510 in the +X direction shown in FIG. 5 causes first side 626 of second piloting member 620 to contact cylindrical wall 590 before distal ends 524 and/or 534 contact inner surface 507 of shell 502.

In one embodiment of Applicant's tape cartridge, gap 615 and gap 625 are substantially equal. By substantially equal, Applicants mean that the distances of gap 615 and gap 625 differ by less than about plus or minus 10%. In other embodiments, gap 615 and 625 differ in dimension. Similarly, in one embodiment of Applicants' tape cartridge, gaps 617 and 627 are substantially equal. In other embodiments, gap 617 and 627 differ in dimension.

In the three piloting member embodiment described above, third piloting member 630 (FIG. 7) is disposed on inner surface 504 (FIG. 5) of top side 503 (FIG. 5) of shell 502 (FIG. 5) such that distal end 634 (not shown in FIG. 5) is separated from top surface 652 (FIGS. 5, 6, 7) by gap 635 (not shown in FIG. 5). In one embodiment, gaps 615, 625, and 635 are substantially equal. In other embodiments, gaps 615, 625, and 635 differ in dimension. In the three piloting member embodiment, rotation of reel 210 (FIG. 5) around the Z axis, causes one or more of the piloting members to contact annular ring 650 thereby preventing distal ends 524/534 of flanges 520/530 from contacting inner surfaces 504 (FIG. 5) and/or 506 (FIG. 5) of shell 502 (FIG. 5). In addition, lateral movement of reel 510 along the +/−X axis causes one or more of the piloting members to contact cylindrical surface 590 thereby preventing any of the distal ends 524 and/or 534 from contacting inner surfaces 505 and/or 507.

In the plurality of piloting member embodiments, the distal ends of the plurality of piloting members are separated from top surface 652 (FIGS. 5, 6, 7) by gaps that are substantially equal. In addition, the first sides of the plurality of piloting members, i.e. those sides disposed farthest from center 582 (FIGS. 6, 7) of aperture 580 (FIGS. 5, 6, 7), are separated from cylindrical wall 590 (FIG. 5) by gaps that are substantially equal. In this embodiment, upon rotation of reel 210 (FIG. 5) along the Z axis (FIG. 5), one or more of the piloting members contacts annular ring 650 (FIG. 5) thereby preventing distal ends 524/534 of flanges 520/530 from contacting inner surface 504 (FIG. 5) and/or 506 (FIG. 5) of shell 502 (FIG. 5). In addition, movement of reel 210 in the +/−X direction causes one or more of the piloting members to contact cylindrical wall 590 (FIG. 5) thereby preventing distal ends 524/524 (FIG. 5) from contacting inner surface 505 (FIG. 5) and/or inner surface 507 (FIG. 5).

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A tape cartridge, comprising:

a shell comprising an inner surface, an outer surface, a top side, and a bottom side;

a reel rotatably disposed within said shell, wherein said reel comprises a hub having a first side and an opposing second side, such that said first side of said hub is disposed adjacent said top side, wherein said hub further comprises an aperture internally disposed therein and extending through said first side of said hub, wherein the walls of said aperture comprise a cylindrical surface, and wherein said second side of said hub includes an annular groove, said annular groove comprising two opposed walls and a floor connecting said opposed walls;

a first flange having a proximal end and a distal end, wherein said proximal end of said first flange is connected to said hub at said first side of said hub;

a second flange having a proximal end and a distal end, wherein said proximal end of said second flange is connected to said hub at said second side of said hub;

wherein said distal ends of said flanges extend radially from said hub;

an annular ring having a first side, an opposing second side, and a first surface connecting said first side and said second side, wherein said first side of said annular ring is disposed on said cylindrical surface, and wherein said first surface extends outwardly from said cylindrical surface toward the center of said aperture such that said first surface faces said top side;

a first piloting member having a proximal end and a distal end, wherein said proximal end of said first piloting member is disposed on said inner surface on said top side, wherein said distal end of said first piloting member extends outwardly from said inner surface towards said first surface and such that a first gap separates said distal end of said first piloting member from said first surface of said annular ring;

a second piloting member having a proximal end and a distal end, wherein said proximal end of said second piloting member is disposed on said inner surface on said top side, wherein said distal end of said second piloting member extends outwardly from said inner surface towards said first surface and such that a second gap separates said distal end of said second piloting member from said first surface of said annular ring;

wherein said first pilot member and said second pilot member limit the movement of said reel within said shell such that said distal end of said first flange cannot contact said inner surface of said shell and such that said distal end of said second flange cannot contact said inner surface of said shell;

an annular member having a proximal surface and a distal surface, wherein said proximal surface is disposed on said inner surface on said bottom side such that said distal surface of said annular member extends into said annular groove;

a third gap separating said distal surface of said annular member from said floor of said annular groove, wherein said third gap is adjusted to limit the movement of said reel within said shell such that such that said distal ends of said flanges cannot contact said inner surface of said shell.

2. An automated data storage system for storing and accessing a plurality of tape cartridges stored in a plurality of storage slots, said automated data storage system having at least one data storage drive for receiving said tape cartridges and reading and/or writing data thereon and one or more accessors for accessing and transporting said tape cartridges between said storage slots and said data storage drive, wherein said one or more accessors is moveably disposed within said automated data storage system, wherein one or more of said plurality of tape cartridges comprises:

a shell comprising an inner surface, an outer surface, a top side, and a bottom side;

a reel rotatably disposed within said shell, wherein said reel comprises a hub having a first side and an opposing second side, such that said first side of said hub is disposed adjacent said top side, wherein said hub further comprises an aperture internally disposed therein and extending through said first side of said hub, wherein the walls of said aperture comprise a cylindrical surface, and wherein said second side of said hub includes an annular groove, said annular groove comprising two opposed walls and a floor connecting said opposed walls;

a first flange having a proximal end and a distal end, wherein said proximal end of said first flange is connected to said hub at said first side of said hub;

a second flange having a proximal end and a distal end, wherein said proximal end of said second flange is connected to said hub at said second side of said hub;

wherein said distal ends of said flanges extend radially from said hub;

an annular ring having a first side, an opposing second side, and a first surface connecting said first side and said second side, wherein said first side of said annular ring is disposed on said cylindrical surface, and wherein said first surface extends outwardly from said cylindrical surface toward the center of said aperture such that said first surface faces said top side;

a first piloting member having a proximal end and a distal end, wherein said proximal end of said first piloting member is disposed on said inner surface on said top side, wherein said distal end of said first piloting member extends outwardly from said inner surface towards said first surface and such that a first gap separates said distal end of said first piloting member from said first surface of said annular ring;

a second piloting member having a proximal end and a distal end, wherein said proximal end of said second piloting member is disposed on said inner surface on said top side, wherein said distal end of said second piloting member extends outwardly from said inner surface towards said first surface and such that a second gap separates said distal end of said second piloting member from said first surface of said annular ring;

an annular member having a proximal surface and a distal surface, wherein said proximal surface is disposed on said inner surface on said bottom side such that said distal surface of said annular member extends into said annular groove;

a third gap separating said distal surface of said annular member from said floor of said annular groove, wherein said third gap is adjusted to limit the movement of said reel within said shell such that such that said distal ends of said flanges cannot contact said inner surface of said shell.

3. A method to prevent damage to a tape medium disposed with a tape cartridge, comprising the steps of:

providing a shell comprising an outer surface, an inner surface, a top side, a bottom side, and a first axis disposed between said top side and said bottom side;

rotatably disposing a reel within said shell, wherein said reel comprises a hub having a first side and an opposing second side, such that said first side of said hub is disposed adjacent said top side of said shell, said hub further comprising an aperture internally disposed therein and extending through said first side of said hub, wherein the walls of said aperture comprise a cylindrical surface, said hub further comprising a first flange having a proximal end and a distal end, wherein said proximal end of said first flange is connected to said hub at said first side of said hub, said hub further comprising a second flange having a proximal end and a distal end, wherein said proximal end of said second flange is connected to said hub at said second side of said hub, said distal ends of said first flange and said second flange extending radially from said hub and arranged to contain said tape medium as said tape is wound around said hub;

disposing on said cylindrical surface an annular ring having a first side, an opposing second side, and a first surface connecting said sides, wherein said first side of said annular ring is disposed on said cylindrical surface and said first surface extends outwardly from said cylindrical surface toward the center of said aperture such that said surface of said annular ring faces said top side;

disposing on said inner surface on said top side a first piloting member having a first side and a distal end, wherein said distal end of said first piloting member extends outwardly from said inner surface towards said first surface and such that said distal end of said first member is separated from said first surface by a first gap; and disposing on said inner surface on said top side a second piloting member having a first side and a distal end, wherein said distal end of said second piloting member extends outwardly from said inner surface towards said first surface and such that said distal end of said second piloting member is separated from said first surface by a second gap;

adjusting said first gap such that upon rotation of said reel in a first direction around a second axis differing from said first axis said first piloting member contacts said annular ring before either of said distal ends of said pair of flanges contacts said inner surface of said shell;

adjusting said second gap such that upon rotation of said reel in a second direction around a second axis differing from said first axis said second piloting member contacts said annular ring before either of said distal ends of said pair of flanges contact said inner surface of said shell;

forming said hub to include an annular groove in said second side of said hub, said annular groove comprising two opposed walls and a floor connecting said opposed walls;

disposing on said inner surface on said bottom side an annular member having a distal surface extending outwardly from said inner surface such that said distal surface of said annular member is separated from said floor of said annular groove by a third gap;

adjusting said third gap such that upon rotation or lateral movement of said reel along a second axis differing from said first axis said distal end of said annular member contacts said floor of said groove before either of said distal ends of said pair of flanges contacts said inner surface of said shell.

\* \* \* \* \*